US008144797B2

(12) United States Patent
Mujtaba et al.

(10) Patent No.: US 8,144,797 B2
(45) Date of Patent: Mar. 27, 2012

(54) CQI TABLE FOR WIRELESS MIMO NETWORKS

(75) Inventors: Syed Aon Mujtaba, Watchung, NJ (US); Xiaowen Wang, Bridgewater, NJ (US)

(73) Assignee: Intel Mobile Communications GmbH, Neubiberg (DE)

( * ) Notice: Subject to any disclaimer, the term of this patent is extended or adjusted under 35 U.S.C. 154(b) by 715 days.

(21) Appl. No.: 12/249,739

(22) Filed: Oct. 10, 2008

(65) Prior Publication Data

US 2009/0245408 A1 Oct. 1, 2009

Related U.S. Application Data

(60) Provisional application No. 61/039,350, filed on Mar. 25, 2008.

(51) Int. Cl.
*H04B 7/02* (2006.01)

(52) U.S. Cl. ........................................ 375/267

(58) Field of Classification Search ............ 375/227, 375/260, 267, 295, 299, 316, 340, 358; 370/465; 455/69, 101
See application file for complete search history.

(56) References Cited

U.S. PATENT DOCUMENTS

| 7,317,702 | B2 | 1/2008 | Dominique et al. |
| 7,412,212 | B2 * | 8/2008 | Hottinen ................ 455/101 |
| 7,477,699 | B2 * | 1/2009 | Wang et al. ............. 375/267 |
| 7,649,831 | B2 * | 1/2010 | Van Rensburg et al. ..... 370/203 |
| 7,903,614 | B2 * | 3/2011 | Pietraski ................ 370/335 |
| 7,907,958 | B2 * | 3/2011 | Sampath et al. .......... 455/509 |
| 2004/0142698 | A1 | 7/2004 | Pietraski |
| 2007/0005749 | A1 * | 1/2007 | Sampath ................ 709/223 |
| 2007/0032196 | A1 | 2/2007 | Dominique et al. |
| 2007/0098099 | A1 * | 5/2007 | Gore et al. ............. 375/260 |
| 2007/0147536 | A1 * | 6/2007 | Melzer et al. ........... 375/267 |
| 2007/0254602 | A1 | 11/2007 | Li et al. |
| 2007/0259671 | A1 | 11/2007 | Cheng et al. |
| 2007/0293230 | A1 | 12/2007 | Lee |
| 2008/0013610 | A1 | 1/2008 | Varadarajan et al. |
| 2008/0026744 | A1 | 1/2008 | Frederiksen et al. |
| 2008/0151804 | A1 * | 6/2008 | Wang et al. ............. 370/312 |
| 2008/0298482 | A1 * | 12/2008 | Rensburg et al. ......... 375/260 |

OTHER PUBLICATIONS

LG Electronics, Inc. "Way Forward on PUCCH CQI coding" R1-08075 Agenda Item 6.2, Jan. 14-18, 2008, Sevilla, Spain.

(Continued)

*Primary Examiner* — Khanh C Tran
(74) *Attorney, Agent, or Firm* — Eschweiler & Associates, LLC

(57) ABSTRACT

A Channel Quality Indicator table for wireless multiple input multiple output (MIMO) networks is disclosed. In one embodiment, a method of generating a table for channel quality indicator (CQI) for an open loop MIMO transmission includes calculating performance of a link between a transmitter and a user end unit for each MIMO transmission mode over a range of average signal-to-noise ratio, and selecting the MIMO transmission mode that maximizes performance for each subset of the range of average signal-to-noise ratio. The method further includes storing the selected MIMO transmission mode and the corresponding subset of the range of average signal-to-noise ratio in a CQI table, the CQI table being stored in an user end unit and a base transceiver station of the open loop MIMO network.

26 Claims, 7 Drawing Sheets

OTHER PUBLICATIONS

AT&T, Alcatel-Lucent, Asustec, CMCC, Comsys, Ericsson, ETRI, Freescale, Huawei, I2R, ICERA, ITRI, Marvell, Mitsubishi, Motorola, NEC, Nokia, Nokia-Siemens-Networks, Nortel, NTT Docomo, Panasonic, Philips, Samsung, Sunplus Mmobile, Texas Instruments, Vodafone, ZTE "Further Details of Large Delay CDD for E-UTRA", R1-080579 Agenda Item 6.3.5, Jan. 14-18, 2008, Sevilla, Spain.
Qualcomm Europe "CQI Table fo DL Transmission" R1-08xxxx Agenda Item xxx, Jan. 14-18, 2008, Sevilla, Spain.
Nortel "Discussion on Rank Adaption Based on Shadowing for High Speed UEs" R1-073296 Agenda Item 7.2.6, Aug. 20-24, 2007, Athens, Greece.
Texas Instruments "Embedding ACK/NAK in CQI Reference Signals and Receiver Structures" R1-080190 Agenda Item 6.1.4, Jan. 14-18, 2008, Sevilla, Spain.
$3^{RD}$ Generation Partnership Project Technical Specification Group Radio Access Network "Feasibility Study on Synchronized E-DCH for UTRA FDD" (Release 8), 3GPP TR 25.823 V0.1.1 (Jan. 2008).
$3^{RD}$ Generation Partnership Project Technical Specification Group Radio Access Network "Physical Channels and Modulation" (Release 8), 3GPP TS 36.211 V1.2.0 (Jun. 2007).

* cited by examiner

CQI TABLE FOR WIRELESS MIMO NETWORKS

This application claims the benefit of U.S. Provisional Application No. 61/039,350, filed on Mar. 25, 2008, entitled "CQI Table Construction and Selection for Open Loop MIMO," which application is hereby incorporated herein by reference in its entirety.

TECHNICAL FIELD

The present invention relates generally to wireless communication systems, and more particularly, to a channel quality indicator table for wireless MIMO networks.

BACKGROUND

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link.

MIMO may be performed as either an open loop or a closed loop technique. In open loop MIMO, a transmitter has no specific knowledge of the condition of the channel before signals are transmitted to a receiver. In closed loop MIMO, on the other hand, channel-related information is fed back from the receiver to the transmitter to allow the transmitter to precondition transmit signals before they are transmitted to better match the present channel state. However, under many conditions, for example, at high vehicular speeds of the user end device, the channel ages very fast, imposing significant challenges on the wireless communication system.

Hence, there is a general need for strategies to improve transmission in MIMO systems by adapting the link between the transmitter and the receiver.

SUMMARY OF THE INVENTION

These and other problems are generally solved or circumvented, and technical advantages are generally achieved, by preferred embodiments of the present invention.

Embodiments of the present invention include channel quality indicator table for open loop MIMO transmission. In accordance with a preferred embodiment of the present invention, a method of generating a table for channel quality indicator (CQI) for an open loop MIMO transmission comprises calculating the performance of a link between a transmitter and a user end unit for each MIMO transmission mode over a range of average signal-to-noise ratio, and selecting the MIMO transmission mode that maximizes performance for each subset of the range of average signal-to-noise ratio. The method further includes storing the selected MIMO transmission mode and the corresponding subset of the range of average signal-to-noise ratio in a CQI table, the CQI table being stored in an user end unit and a base transceiver station of the open loop MIMO network.

The foregoing has outlined, rather broadly, the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3, which includes

FIG. 5, which includes

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
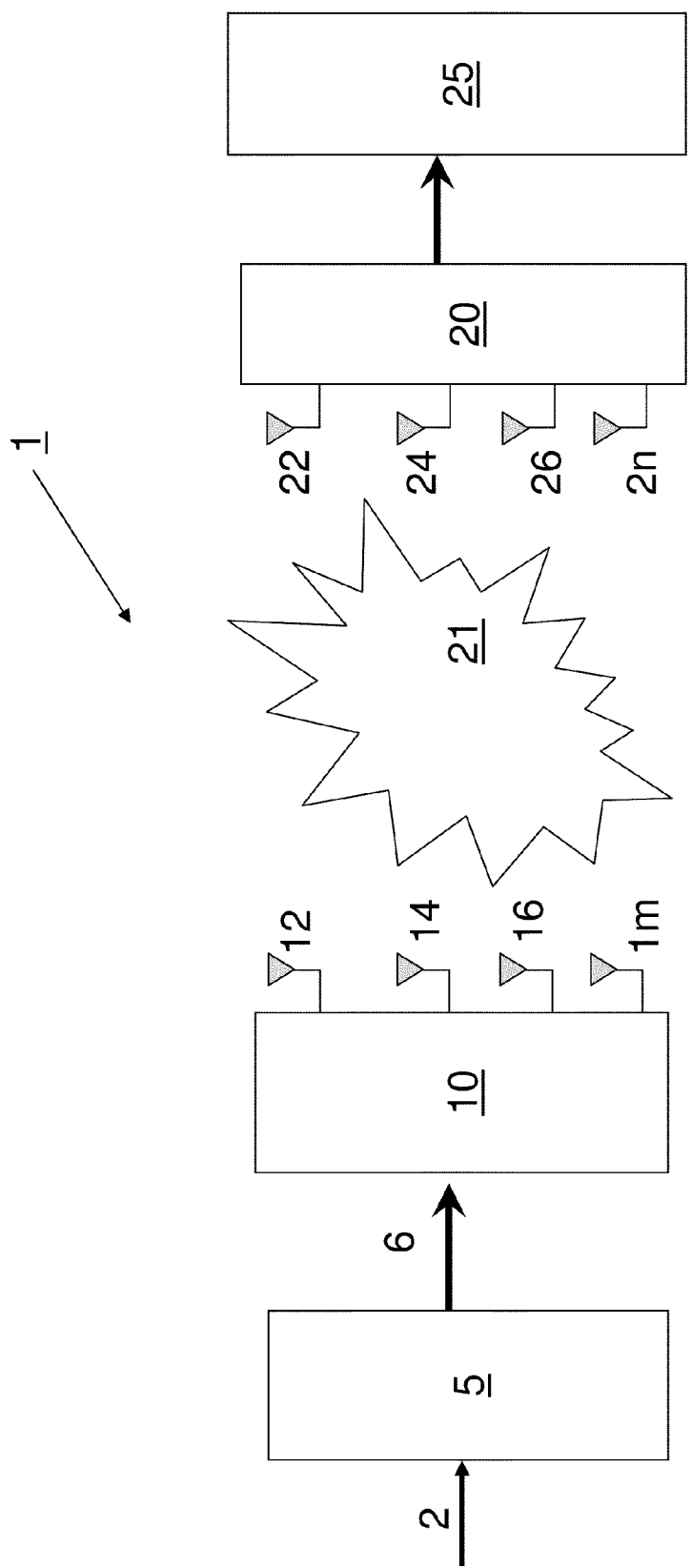
FIG. 1 is a block diagram illustrating a wireless communication system using a MIMO based wireless system, in accordance with an embodiment of the present invention.

The making and using of the presently preferred embodiments are discussed in detail below. It should be appreciated, however, that the present invention provides many applicable inventive concepts that can be embodied in a wide variety of specific contexts. The embodiments discussed herein are merely illustrative of specific ways to make and use the invention, and do not limit the scope of the invention.

The present invention will be described with respect to preferred embodiments in a specific context, namely, a channel quality indicator table used in open loop MIMO transmission. The invention may also be applied, however, to other types of tables for use in other types of wireless networks or protocols.

Adaptation techniques adapt the transmission parameters to take advantage of prevailing channel conditions. The fundamental parameters to be adapted include rank, preceding matrix, modulation, and coding levels. Adaptation is a key solution to increase the spectral efficiency of wireless communication systems. Adaptation exploits the variations of the wireless channel (over time, frequency, and/or space) by dynamically adjusting certain key transmission parameters to the changing environmental and interference conditions observed between the base station (Node B) and the subscriber (user end UE).

In practical implementations, the values for the transmission parameters are quantized and grouped together as a set of modes. An example of such a set of modes includes a pairing of modulation level and coding rate. Since each such mode comprises a different data rate (expressed in bits per second) and robustness level (minimum signal-to noise ratio (SNR)

needed to activate the mode), they are optimal for use in different channel/link quality regions. A link adaptation algorithm selects the most efficient mode, over varying channel conditions based, for example, on a mode selection criterion. Thus, in poor channel conditions, modes are selected to enable communication thereby rendering a robust system. Under good channel conditions, spectrally efficient modes are selected to increase throughput. Link adaptation itself is necessary for both closed and open loop. Typical link adaptation works best with a closed loop MIMO scheme due to effective feedback possible in closed loop MIMO. However, closed loop link adaptation is sub-optimal under adverse conditions, such as if the receiver is moving at high vehicular speeds. The problem in the high speed case is that closed loop MIMO (not just link adaptation part) requires accurate channel information which is not possible at high speeds. Further, link adaptation is problematic for open loop because we cannot select modulation and coding schemes (MCS) based on instantaneous SNR.

Further, link adaptation is either unproven or incapable of robust operation under adverse environment, for example, under high vehicular speeds wherein the channel ages very rapidly. More specifically, the growing popularity of MIMO creates the need for link adaptation solutions in adverse environments that integrate temporal, spatial, and spectral components. By providing an improved channel quality indicator table this sub-optimal link adaptation is offset in various embodiments. In various embodiments, the present invention establishes a technique for link adaptation that is robust, low in complexity, and provides cost effective procedures for future wireless systems.

A wireless communication system using a MIMO based wireless system is first described using FIG. 1, in accordance with an embodiment of the present invention. An embodiment of the invention using the adaptation is illustrated in FIG. 3. Embodiments of the invention for generating the channel quality indicator table for open loop MIMO are next described using FIGS. 4 and 5.

FIG. 1 is a block diagram illustrating a wireless communication system using a MIMO based wireless system, in accordance with an embodiment of the invention. A compressed digital source in the form of a binary data stream 2 is fed to a simplified transmitting block 5, encompassing the functions of error control coding and (possibly joined with) mapping to complex modulation symbols. The simplified transmitting block 5 produces several separate symbol streams which range from independent to partially redundant or fully redundant. Each of the symbol streams is mapped to one of the multiple transmitter antennas 12-1$m$. Mapping may include linear spatial weighting of the antenna elements or linear antenna space-time precoding. After upward frequency conversion, filtering and amplification, the transmitting signals 6 are launched into the wireless channel by the multiple transmitters 12-1$m$. At the receiver 20, the signals are captured by possibly multiple antennas. For example, in one embodiment, a 4×2 MIMO comprised of four transmitters and two receivers is used.

Subsequently, demodulation and demapping operations are performed in a receiver unit 25 to recover the message. The level of intelligence, complexity, and a priori channel knowledge used in selecting the coding and antenna mapping algorithms is adapted by the receiver unit 25 during the link 1, depending on the application and the nature of the transmission.

The wireless transmitter 10 communicates with the wireless receiver 20 via the wireless channel 21. In one embodiment, the transmitter 10 comprises "m" transmit antennas 12, 14, 16, . . . , and 1$m$ and the receiver 20 comprises "n" receive antennas 22, 24, 26, . . . , and 2$n$. In other embodiments, any number of transmit antennas and any number of receive antennas are used to form a MIMO channel. The wireless link 1 utilizes either closed loop or open loop MIMO techniques. The transmitter 10 dynamically tailors the transmit signals 6 to the channel in a manner that improves channel throughput, or minimizes bit error rate, or both. For example, a transmitted signal 6 is transmitted simultaneously through all four transmit antennas 12, 14, 16, and 1$m$, by decomposition into independent ¼ rate bit sequence. If the transmit signals 6 from each of the transmitters 12, 14, 16 and 1$m$ into the channel are different from each other, there will be a 4-fold increase in the channel capacity In various embodiments, the receiver 20 transmits channel-related feedback information to the transmitter 10 for use by the signal processing block 5 in developing transmit signals 6. The receiver 20 generates the feedback information by, for example, appropriately processing reference information received from the transmitter 10.

This feedback of the instantaneous channel quality conditions calculated by the receiver 20 is referred to as Channel Quality Indicators (CQIs). CQI values may correspond to any suitable channel parameter including Signal-to-Noise Ratio (SNR), Signal-to-Interference and Noise Ratio (SINR), power of received signal, supportable data rates, supportable modulation and/or coding rates, and supportable throughput as examples.

The receiver 20 transmits this feedback information (CQI) to the transmitter 10 such as a base station, e.g., via physical layer signaling. CQI information may be used to determine transmission scheduling among multiple receivers, select suitable transmission schemes (e.g., the number of transmit antennas to activate), determine bandwidth allocation, select spreading codes, determine modulation and coding rates, etc.

CQI information in 3GPP LTE is transmitted in the form of a CQI message. The receiver 20 generates the CQI messages by first measuring channel quality, e.g., SNR or SINR. The receiver 20 then accesses a standardized CQI table where the table contains ranges of uniquely indexed CQI values. The range in which the measured channel quality falls is identified by selecting the corresponding index value. The selected index value is mapped to a sequence of channel quality information bits, e.g., using a (20, 5) block coding technique where 5 bits are encoded into a 20 bit-codeword for error protection. The encoded channel quality information bits are then mapped onto a physical channel and transmitted as a message.

The ranges of CQI values stored in a conventional CQI table are fixed and predetermined well in advance of the system deployment. In one embodiment, all transmission systems and cells compatible with the 3G Universal Mobile Telecommunications System (UMTS) technology use a fixed table of CQI values having predetermined spacing regardless of individual cell characteristics. In various embodiments, a universal table of CQI values is used to form CQI message. Both the number of transmitted streams and the bit error rate on each stream determine the link's efficiency (error free fraction of the conventional physical layer throughput per transmitter antenna times the number of transmitting antennas) rather than just the number of independent input streams. Since the use of coding on the multi-antenna signals (space-time coding) has a critical effect on the bit error rate behavior, it becomes an important component of MIMO design. In various embodiments, the receiver 20 selects a CQI index from a single CQI table that maximizes the spectral efficiency and throughput of the receiver and feeds the selected index back to the transmitter 10. The transmitter 10 matches the received CQI index value from the receiver 20 and looks up a CQI table stored within the transmitter 10. The table look up generates the transmission parameters thus avoiding band intensive transmission of the actual transmission parameters over the wireless channel. In various embodiments, the CQI table also comprises the MIMO modes used in the wireless network. Hence, an optimum MIMO mode is also selected for a certain channel characteristic defined, for example, by a signal-to-noise ratio.

Figure 2:
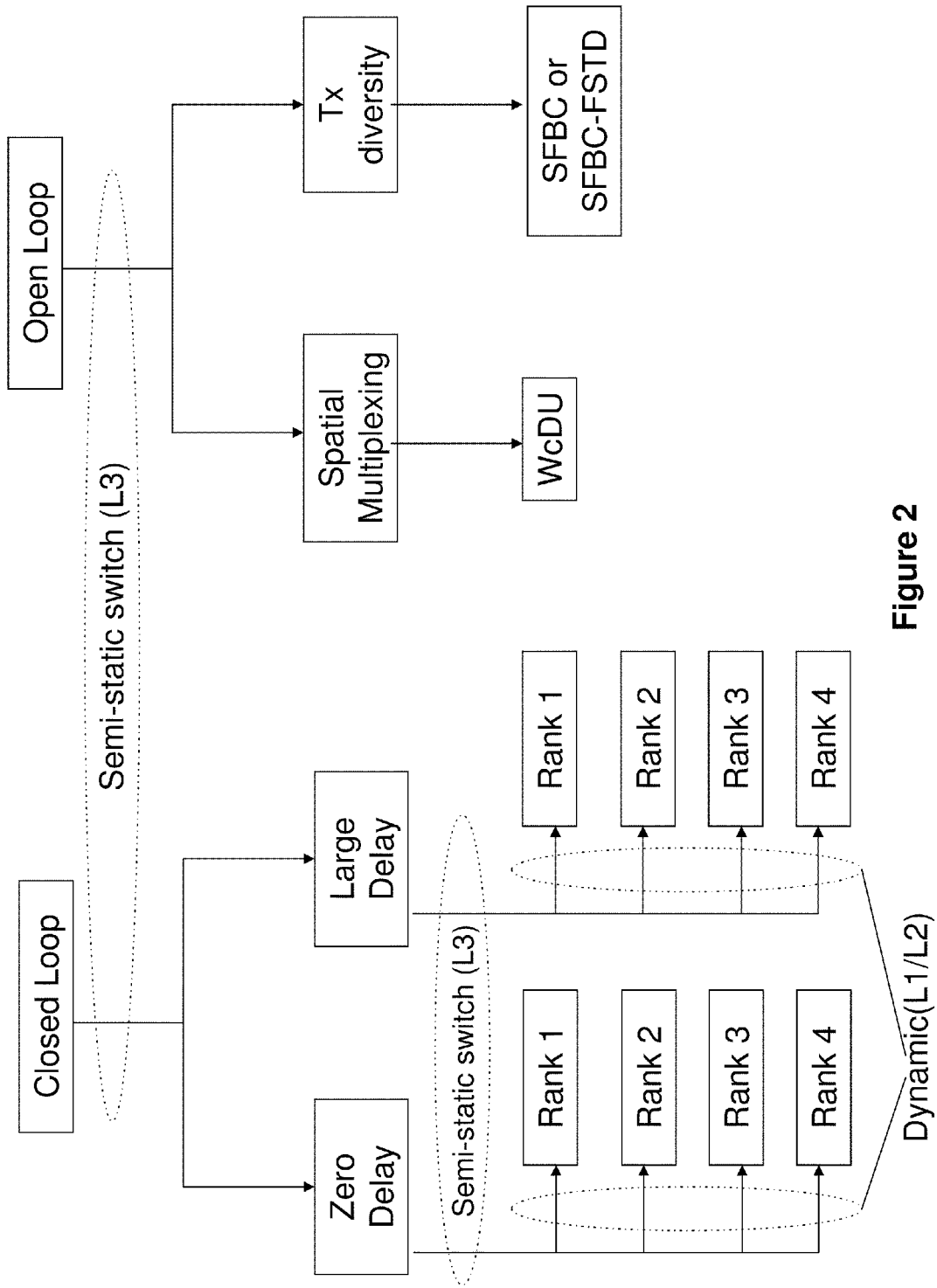
FIG. 2 illustrates 3GPP-LTE MIMO modes used in various embodiments of the present invention.

FIG. 2 illustrates 3GPP-LTE MIMO modes used in embodiments of the present invention. 3GPP LTE (Long Term Evolution) is the name given to a project within the Third Generation Partnership Project to improve the Universal Mobile Telecommunications System (UMTS) to cope with future requirements.

The MIMO modes supported in 3GPP-LTE include both transmit diversity and spatial multiplexing modes. Transmit diversity is achieved by using space-time codes that introduce temporal and spatial correlation into signals transmitted from different antennas, in order to provide diversity at the receiver, and coding gain over an uncoded system without impairing bandwidth efficiency. Transmit diversity is used to offset transmission loss effects including effects arising from fading during the propagation in the channel. Examples of transmit diversity coding include space frequency block coding (SFBC), space time block coding (STBC), and space-time trellis coding (STTC). In spatial multiplexing, a signal is divided into multiple layers or streams, and transmitted in parallel, increasing the throughput of the transmission. In various embodiments, the standard modes supported in 3GPP-LTE are used, although in other embodiments, more or less transmission modes are used.

In one embodiment, the MIMO modes in closed loop transmission comprise two modes: a zero delay mode and a large delay mode. Open loop MIMO in various embodiments comprises two modes: a spatial multiplexing mode (e.g., a open loop special multiplexing mode also referred to as WcDU), and a transmit diversity mode. In closed loop MIMO, the signal is mapped by three matrices: a precoding matrix W, a cyclic delay matrix D, and a discrete Fourier transform (DFT) matrix U. In the open loop spatial multiplexing mode (WcDU), a set of precoding matrices W is cycled periodically instead of any one particular precoding matrix W.

The transmit diversity mode uses either space frequency block coding (SFBC) or SFBC and frequency switched transmit diversity (FSTD). These modes are semi-statically configured and signaled by Layer-3 (L3) signaling. As the transmitters are fixed, the vehicular speed of the receiver defines the delay, and thus the ageing of the channel state information. To improve the performance of an open loop transmission, a cyclic precoding matrix index scheme may be used that cyclically selects a codeword.

Figure 3A:
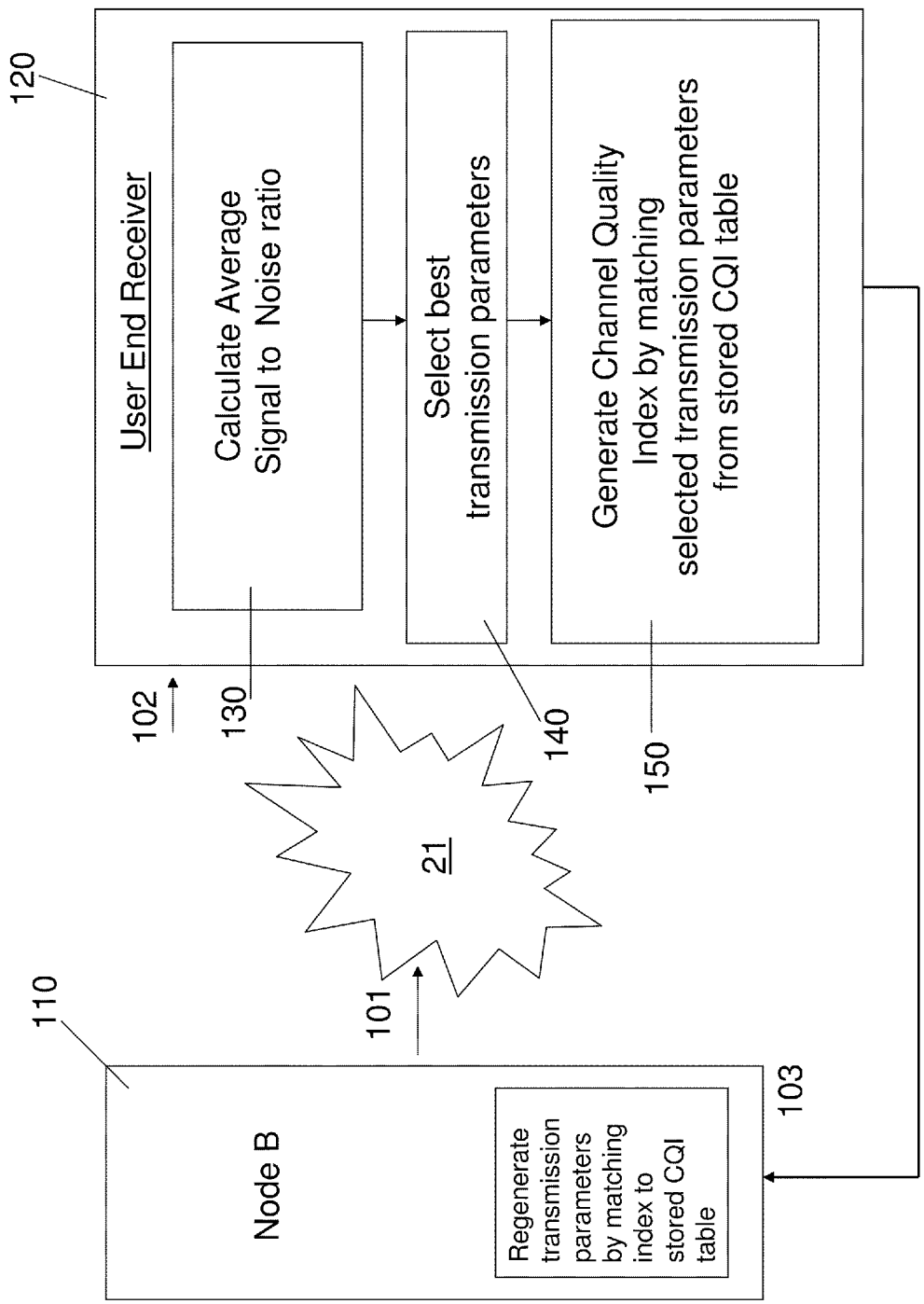
FIGS. 3a and 3b, illustrate a schematic of the link adaptation, in accordance with an embodiment of the present invention.
Figure 3B:
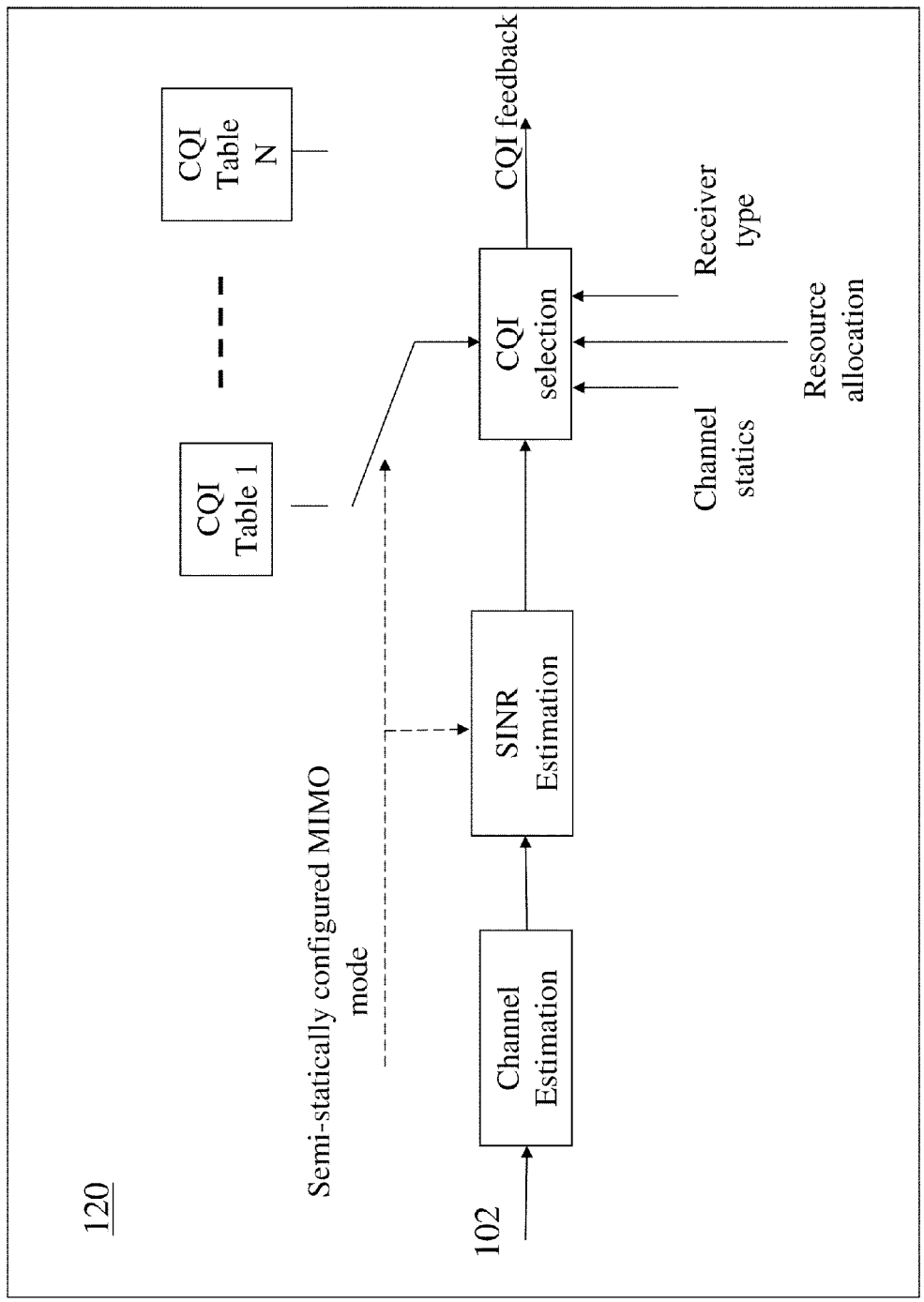

In various embodiments, instead of handling each MIMO mode separately in generating channel feedback information, an integrated feedback is selected. The integrated feedback is generated by selecting a CQI index from a CQI table comprising all MIMO modes A schematic of the link adaptation process using a hybrid CQI table is illustrated in FIG. 3, in accordance with an embodiment of the present invention. FIG. 3a illustrates the wireless communication system comprising a transmitter and a receiver, whereas FIG. 3b illustrates the generation of CQI feedback within the receiver, in accordance with an embodiment of the invention. FIG. 3 illustrates an embodiment wherein user end (UE) procedures support link adaptation in 3GPP-LTE.

Referring to FIG. 3a, a base station (Node B) 110 communicates with user equipment or user unit receiver 120, which may be a mobile telephone, computer, laptop, hand held device, or other such device. As illustrated in FIG. 3, the Node B 110 sends reference information 101 to the user unit receiver 120. The user unit receiver 120 estimates the channel information through the reference information 101 sent by Node B 110. The user unit receiver 120 generates a feedback information 103, for example, by appropriately processing the received reference information 102 in combination with a channel quality indicator table. The feedback information 103 comprises a CQI index that defines transmission parameters such as modulation and coding scheme, rank.

After receiving the received reference information 102, the user unit receiver 120 calculates an average signal to interference and noise ratio (SINR) 130. The average signal to interference and noise ratio is calculated in open loop MIMO as a result of the invalidity of the instantaneous SINR due to, for example, fast channel ageing. The average SNR is computed based on the average of the channel gains across both time and frequency.

Subsequently as illustrated in FIG. 3b, the user unit receiver 120 uses this calculated average signal to interference and noise ratio (SINR) 130 along with the other information such as type of receiver, channel statistics, resource allocation etc, to select transmission parameters that maximize performance, for example, spectral efficiency, throughput. Using a table look (comparing to a CQI table stored in a memory region of the user end receiver 120), an appropriate CQI index is generated. A feedback information 103 comprising the CQI index is generated.

In various embodiments, the feedback information 103 is selected from a CQI table by matching the generated channel condition, e.g. SNR. For example, for a given range of SNR, a CQI index is selected from the CQI table. In various embodiments, the CQI table includes modulation and coding schemes best suited for transmission over the existing channel 21. Examples of modulation schemes include quaternary PSK (QPSK), 16-quadrature amplitude modulation (16QAM), 64-quadrature amplitude modulation (64QAM), binary phase shift keying (BPSK) etc. In some embodiments, the multiple CQI tables are generated based on, for example, the receiver type. Hence, different user end receivers may select different indices of the CQI table.

In various embodiments, the calculation of the signal to interference and noise ratio (SINR) 130, the CQI index, and the feedback information 103 are added as additional code or by modifying existing code, for example, by suitable modification of the firmware (software) of the user unit receiver 120. In one embodiment, the CQI table is stored in the receiver in a separate hardware, or as part of the other circuitry. In some embodiments, some or all of the functionality require separate hardware inside the user unit receiver 120.

Figure 4:
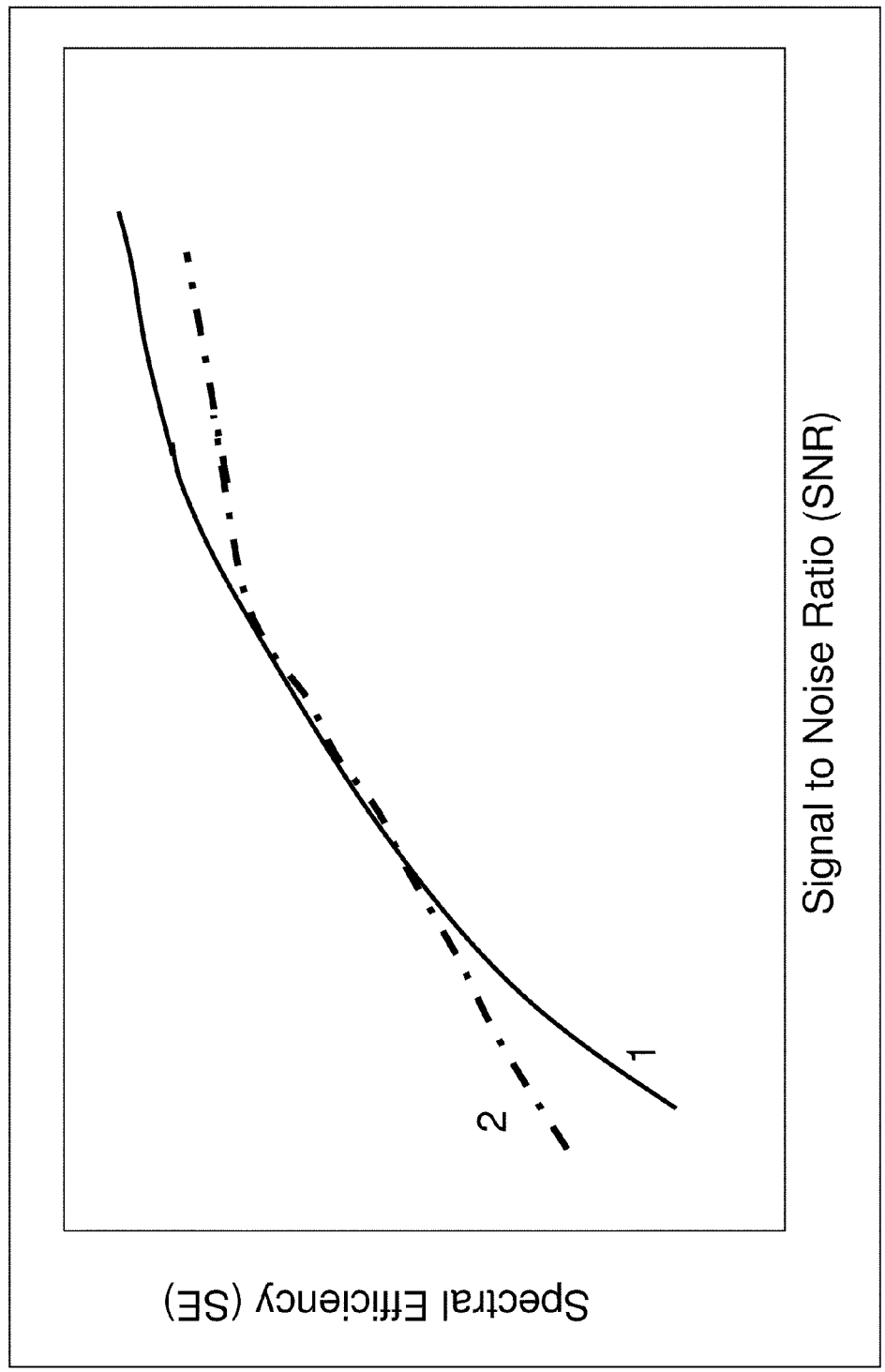
FIG. 4 illustrates a method for generating a hybrid CQI index, in accordance with an embodiment of the invention.

FIG. 4 illustrates a method for generating a hybrid CQI index, in accordance with an embodiment of the invention. In FIG. 4, a channel characteristic, for example, average signal-to-noise ratio is plotted against an output characteristic. In one embodiment, the user end receiver selects to maximize the spectral efficiency. Hence, in one embodiment, the average signal-to-noise ratio is plotted against the spectral efficiency for all MIMO modes. In FIG. 4, curve 1 refers to a first MIMO mode and curve 2 refers to a second MIMO mode. Although not shown, in various embodiments if more MIMO modes are allowed in the wireless network protocol, more curves should be plotted in generating the hybrid table. As illustrated in FIG. 4, curve 2 performs better at low signal-to-noise ratio whereas curve 1 outperforms curve 1 at higher signal-to-noise ratio. However, instead of forming different CQI tables for each curve, a single "effective" table is generated that includes the optimum for both curves. Hence, the new table includes a curve that selects curve 1 at higher signal-to-noise ratio and curve 2 at lower signal-to-noise ratio. Further, in some embodiments, for the intermediate transition region, either one can be selected.

Table 1 illustrates a sample CQI table, e.g., obtained from following the embodiment described in FIG. 4, in accordance with an embodiment of the invention. As illustrated in Table 1, the sample CQI table lists entries for a CQI index, MIMO mode, modulation scheme and coding rate. The MCS indices 1, 4, 7, 9, 10, and 15 correspond to MCS values already defined in the closed loop CQI table. The MCS indices corresponding to 2, 3, 5, 6, 8, and 11-14 are added to the closed loop MIMO table. Thus, a hybrid table is generated from the closed loop CQI table. The hybrid table thus adapted minimizes data transfer from the user end unit to the receiver, even under open loop transmission. Hence, in various embodiments, the present invention leverages CQI tables that help to reduce transmission bandwidth even for open loop MIMO.

FIG. 5 illustrates a simulated spectral efficiency and 10% frame error rate (FER) signal-to-noise ratio validating the approach described with respect to FIG. 4, in accordance with an embodiment. Table II illustrates the simulation parameters used in generating FIG. 5. A Fast Fourier Transform ("FFT") based module is used for the simulations. Although the closed loop CQI table is generated based on an additive white Gaussian noise (AWGN) channel, there is no additive white Gaussian noise (AWGN) channel in open loop MIMO transmission. Hence, a flat fading channel is used. The receiver or user end unit is assumed to be a Linear-Minimum-Mean-Square-Error (LMMSE). Further, being an open MIMO mode, only an average SNR is computed based on the average of the channel gains across both time and frequency. The spectral efficiency of the MIMO modes used in open loop transmission, rank-1 SFBC-FSTD and rank-2 WcDU, are simulated over a range of signal-to-noise ratios while using the closed mode CQI table. The relative performance of the two MIMO modes (rank-1 and rank-2 modes) at low SNR is examined by plotting the log of the spectral efficiency.

TABLE I

| MCS | MIMO Mode | Modulation | Coding rate × 1024 |
|---|---|---|---|
| 1 | SFBC-FSTD | QPSK | 78 |
| 2 | SFBC-FSTD | QPSK | 151 |
| 3 | SFBC-FSTD | QPSK | 250 |
| 4 | SFBC-FSTD | QPSK | 449 |
| 5 | SFBC-FSTD | QPSK | 650 |
| 6 | SFBC-FSTD | 16QAM | 455 |
| 7 | SFBC-FSTD | 16QAM | 616 |
| 8 | SFBC-FSTD | 16QAM | 780 |
| 9 | SFBC-FSTD | 64QAM | 666 |
| 10 | WcDU | 16QAM | 616 |
| 11 | WcDU | 64QAM | 512 |
| 12 | WcDU | 64QAM | 623 |
| 13 | WcDU | 64QAM | 725 |
| 14 | WcDU | 64QAM | 810 |
| 15 | WcDU | 64QAM | 873 |

TABLE II

| Simulation Condition | Simulation Parameter |
|---|---|
| FFT size | 512 |
| Tone spacing | 15 KHz |
| Data Allocation | 4 RBs |
| Channel | Flat fading, 120 km/hr |
| Channel estimation | Ideal |
| Receiver type | LMMSE |

Figure 5A:
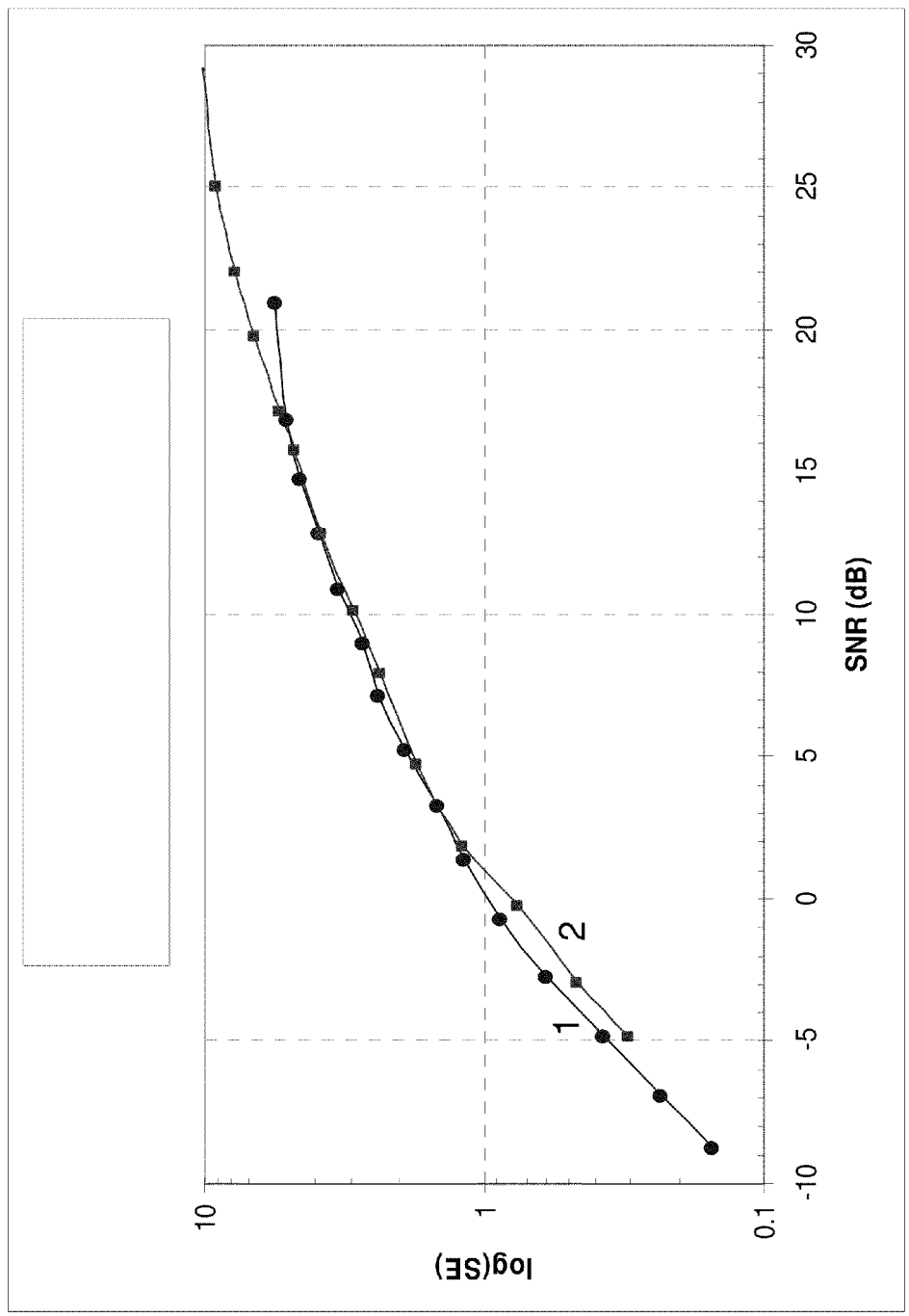
FIGS. 5a and 5b, illustrates a simulated spectral efficiency and signal-to-noise ratio validating the approach described with respect to FIG. 4, in accordance with an embodiment.
Figure 5B:
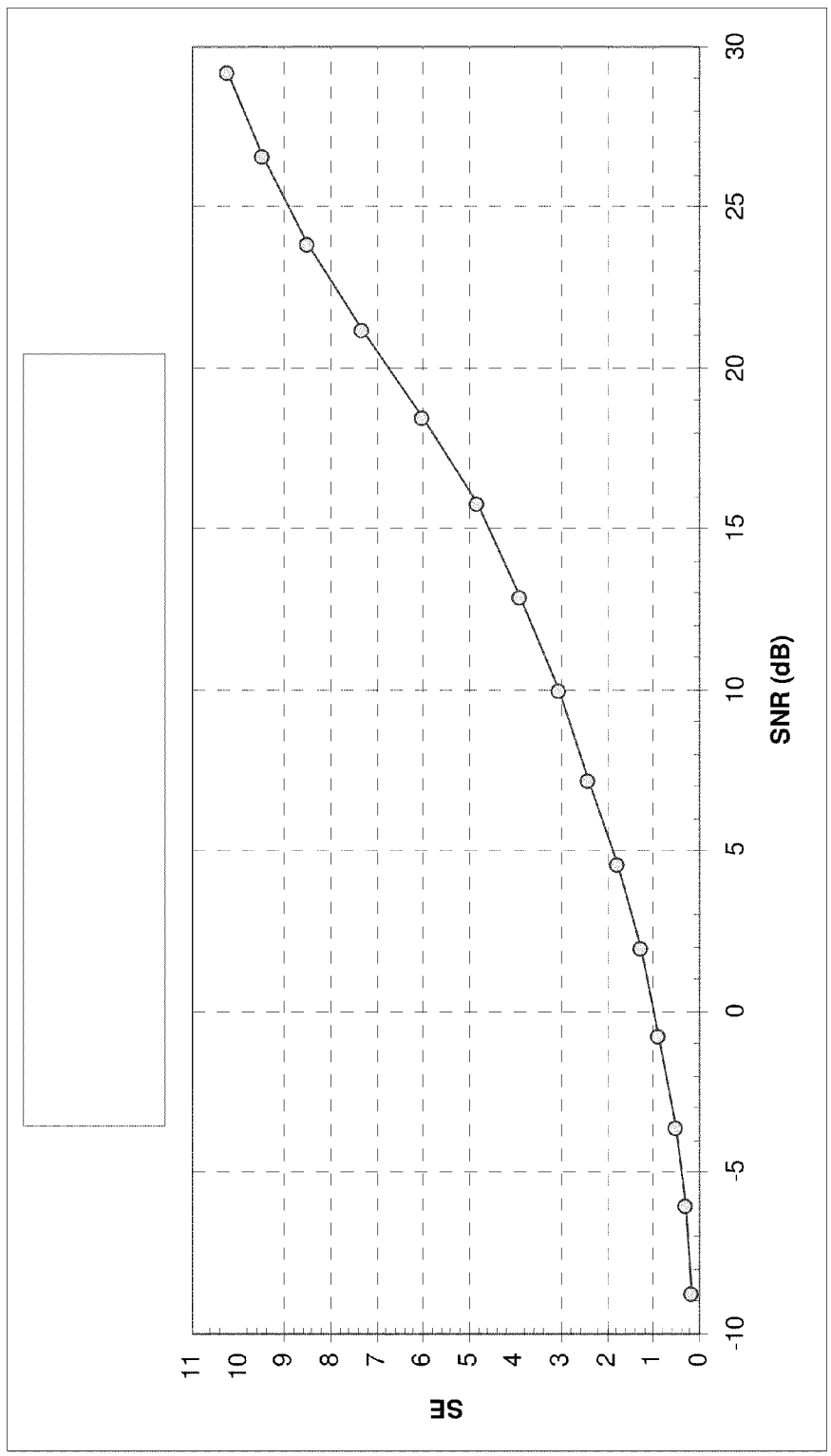

Referring to FIG. 5a, for signal-to-noise ratios from −10 dB to +2 dB, the curve 1 (rank-1 MIMO mode comprising SFBC-FSTD) outperforms curve 2 (rank-2 MIMO mode comprising WcDU). From 10 dB to 15 dB, the two schemes are comparable in performance, and beyond 15 dB rank-2 WcDU outperforms the rank-1 SFBC-FSTD MIMO mode. In the mid-SNR regime, the UE (user end unit) chooses either MIMO mode as the spectral efficiency of the two modes is nearly identical. A static switch point from rank 1 SFBC-FSTD MIMO mode to rank-2 WcDU MIMO mode is performed without impacting link throughput due to either SNR estimation error or a rapid change in the link budget. Hence, in one embodiment, a single CQI table, that switches from the rank 1 mode to the rank 2 mode, is used. The spectral efficiency (SE) of the hybrid CQI table is illustrated in FIG. 5b. As illustrated in FIG. 5b, the SNR step size is uniformed spaced at ~2.7 dB.

Table III lists the spectral efficiency (SE) and the signal to noise ratio (SNR) for each corresponding MIMO mode, along with the modulation and coding rates used in describing FIG. 5.

In one embodiment, a single CQI table (for example, Table I) is used for a 4×2 open loop MIMO transmission, whereby the lower order indices correspond to rank-1 SFBC-FSTD, and higher order indices correspond to rank-2 WcDU. In various embodiments, the hybrid CQI table simplifies the open loop process without compromising performance.

Although the present invention and its advantages have been described in detail, it should be understood that various changes, substitutions, and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that many of the features, functions described herein may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

TABLE III

| MCS | MIMO Mode | Modulation | Coding rate × 1024 | SE | SNR |
|---|---|---|---|---|---|
| 1 | SFBC-FSTD | QPSK | 78 | 0.1522 | −8.7 |
| 2 | SFBC-FSTD | QPSK | 151 | 0.2949 | −6 |
| 3 | SFBC-FSTD | QPSK | 250 | 0.4882 | −3.6 |

TABLE III-continued

| MCS | MIMO Mode | Modulation | Coding rate × 1024 | SE | SNR |
|---|---|---|---|---|---|
| 4 | SFBC-FSTD | QPSK | 449 | 0.8768 | −0.7 |
| 5 | SFBC-FSTD | QPSK | 650 | 1.2695 | 2 |
| 6 | SFBC-FSTD | 16QAM | 455 | 1.7578 | 4.6 |
| 7 | SFBC-FSTD | 16QAM | 616 | 2.406 | 7.2 |
| 8 | SFBC-FSTD | 16QAM | 780 | 3.0469 | 10 |
| 9 | SFBC-FSTD | 64QAM | 666 | 3.9012 | 12.9 |
| 10 | WcDU | 16QAM | 616 | 4.812 | 15.8 |
| 11 | WcDU | 64QAM | 512 | 6 | 18.5 |
| 12 | WcDU | 64QAM | 623 | 7.3008 | 21.2 |
| 13 | WcDU | 64QAM | 725 | 8.5078 | 23.9 |
| 14 | WcDU | 64QAM | 810 | 9.4922 | 26.6 |
| 15 | WcDU | 64QAM | 873 | 10.2297 | 29.2 |

What is claimed is:

1. A wireless device comprising:
a receiver for receiving a reference signal;
a first circuitry for calculating an average signal-to-noise ratio from the received reference signal;
a channel quality indicator (CQI) table stored in a non-volatile memory region of the wireless device, the CQI table comprising all multiple input multiple output (MIMO) modes used in a transmission mapped over a range of signal-to-noise ratio; and
a second circuitry for mapping the calculated average signal-to-noise ratio to the signal-to-noise ratio of the CQI table, the second circuitry selecting a CQI index based on the mapping,
wherein lower indices of the CQI table correspond to a first transmission mode, and wherein higher indices of the CQI table correspond to a second transmission mode, and
wherein the first transmission mode comprises a space frequency block coding and frequency switched transmit diversity (SFBC-FSTD) MIMO mode.

2. The wireless device of claim 1, wherein the second transmission mode comprises an open loop MIMO mode with periodic cycling of preceding matrices.

3. The wireless device of claim 1, wherein the CQI table is designed to maximize a spectral efficiency of a link between a transmitter and the wireless device.

4. The wireless device of claim 1, further comprising a processor comprising the first and the second circuitry for running a software, the software comprising code for calculating an average signal to interference and noise ratio from the reference signal, and determining the CQI index; and at least one memory unit for storing the software run on the processor.

5. A wireless device comprising:
a receiver for receiving a reference signal;
a first circuitry for calculating an average signal-to-noise ratio from the received reference signal;
a channel quality indicator (CQI) table stored in a non-volatile memory region of the wireless device, the CQI table comprising all multiple input multiple output (MIMO) modes used in a transmission mapped over a range of signal-to-noise ratio; and
a second circuitry for mapping the calculated average signal-to-noise ratio to the signal-to-noise ratio of the CQI table, the second circuitry selecting a CQI index based on the mapping,
wherein the average signal-to-noise ratio is calculated based on the average of the channel gains across both time and frequency.

6. A method of providing channel quality feedback in an open loop MIMO transmission, the method comprising:
receiving a reference signal from a transmitter at a user end unit;
calculating an average signal-to-noise ratio based on the received reference signal;
looking up a channel quality indicator (CQI) table stored within the user end unit to calculate a CQI index, wherein the CQI table comprises a hybrid table comprising all the open multiple input multiple output (MIMO) modes used in a wireless protocol; and
transmitting the CQI index to the transmitter,
wherein the average signal-to-noise ratio is calculated based on an average of channel gains across both time and frequency.

7. The method of claim 6, wherein all the open MIMO modes comprise a first MIMO mode comprising rank-1 space frequency block coding and frequency switched transmit diversity (SFBC-FSTD), and rank-2 MIMO mode using spatial multiplexing by periodic cycling of preceding matrices.

8. The method of claim 6, wherein the CQI table comprises MIMO mode, modulation, coding rate, and signal-to-noise ratio.

9. The method of claim 6, wherein the CQI table comprises additional indices relative to a closed loop CQI table.

10. The method of claim 6, wherein the user end unit is traveling at a velocity greater than 30 km/hr.

11. The method of claim 6, wherein the CQI table is designed to maximize a spectral efficiency of a link between the user end unit and the transmitter.

12. A method of providing channel quality feedback in an open loop MIMO transmission, the method comprising:
receiving a reference signal from a transmitter at a user end unit;
calculating an average signal-to-noise ratio based on the received reference signal;
looking up a channel quality indicator (CQI) table stored within the user end unit to calculate a CQI index, wherein the CQI table comprises a hybrid table comprising all the open multiple input multiple output (MIMO) modes used in a wireless protocol; and transmitting the CQI index to the transmitter,
wherein the lower indices of the CQI table correspond to a rank-1 space frequency block coding and frequency switched transmit diversity (SFBC-FSTD), and wherein the higher indices of the CQI table correspond to a rank-2 MIMO mode using spatial multiplexing by periodic cycling of preceding matrices (WcDU).

13. A system for wireless MIMO communication comprising:
a base transceiver station comprising a plurality of transmitting antennas, the transmitting antennas configured to send a reference signal; and
a user end unit comprising a plurality of receiving antennas, the receiving antennas configured to receive a transmitted reference signal from the base transceiver station, the user end unit configured to calculate an average signal-to-noise ratio from the received reference signal, wherein the user end unit looks up a channel quality indicator (CQI) table to generate a CQI index, wherein the CQI table comprises a column comprising a rank-1 multiple input multiple output (MIMO) mode and a rank-2 MIMO mode, wherein the user end unit selects either the rank-1 or the rank 2 MIMO mode from the CQI table to maximize a performance of a link between the base transceiver station and the user end unit.

14. The system of claim 13, wherein the performance comprises spectral efficiency.

15. The system of claim 13, wherein the CQI index is selected based on the average signal-to-noise ratio.

16. The system of claim 13, wherein the user end unit transmits the CQI index to the base transceiver station, wherein the base transceiver station is designed to use the CQI index and calculate a modulation and coding scheme and rank for transmission of data to the user end unit.

17. The system of claim 13, wherein the rank-1 MIMO mode comprises space frequency block coding and frequency switched transmit diversity (SFBC-FSTD) and the rank-2 MIMO mode comprises a mode using spatial multiplexing by periodic cycling of precoding matrices (WcDU).

18. The system of claim 13, wherein the base transceiver station comprises four transmitting antennas and the user end unit comprises two receiving antennas.

19. A method of generating a table for channel quality indicator (CQI) for an open loop multiple input multiple output (MIMO) network, the method comprising:
calculating performance of a link between a transmitter and a user end unit for each MIMO transmission mode over a range of average signal-to-noise ratio;
for each subset of the range of average signal-to-noise ratio, selecting the MIMO transmission mode that maximizes performance; and
storing the selected MIMO transmission mode and the corresponding subset of the range of average signal-to-noise ratio in a CQI table, the CQI table being stored in a user end unit and a base transceiver station of the open loop MIMO network.

20. The method of claim 19, further comprising:
receiving a reference signal transmitted from the base transceiver station at the user end unit;
calculating an average signal-to-noise ratio based on the received reference signal;
looking up the CQI table stored within the user end unit to calculate a CQI index, wherein the CQI table comprises a hybrid table comprising all the open MIMO transmission modes used in a wireless protocol; and
transmitting the CQI index to the base transceiver station.

21. The method of claim 20, further comprising generating a modulation and coding scheme and rank for transmission from the transmitted CQI index at the base transceiver station.

22. The method of claim 20, wherein lower indices of the CQI table correspond to a rank-1 space frequency block coding and frequency switched transmit diversity (SFBC-FSTD), and wherein higher indices of the CQI table correspond to a rank-2 open loop spatial multiplexing (WcDU) MIMO mode.

23. The method of claim 20, wherein the performance comprises a spectral efficiency.

24. The method of claim 19, wherein the CQI table is a 4-bit table comprising modulation and coding rate.

25. The method of claim 19, wherein all open MIMO transmission modes comprise a first MIMO mode comprising rank-1 space frequency block coding and frequency switched transmit diversity (SFBC-FSTD) and rank-2 open loop spatial multiplexing (WcDU) MIMO mode.

26. The method of claim 19, wherein the CQI table comprises additional indices relative to a closed loop CQI table.

* * * * *